US006812316B2

(12) United States Patent
Ohrbom et al.

(10) Patent No.: US 6,812,316 B2
(45) Date of Patent: Nov. 2, 2004

(54) POWDER COATING COMPOSITIONS AND POWDER SLURRY COATING COMPOSITIONS CONTAINING MONOMERIC DIFUNCTIONAL COMPOUNDS

(75) Inventors: Walter H. Ohrbom, Hartland Township, MI (US); David J. Law, Livonia, MI (US); Robert D. Weise, Harper Woods, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/261,427

(22) Filed: Sep. 30, 2002

(65) Prior Publication Data

US 2003/0040580 A1 Feb. 27, 2003

Related U.S. Application Data

(63) Continuation-in-part of application No. 09/741,511, filed on Dec. 19, 2000, now Pat. No. 6,541,594.

(51) Int. Cl.$^7$ ............................................. C08G 18/81
(52) U.S. Cl. ..................... 528/45; 525/934; 525/55; 525/333.7; 525/191; 525/211; 568/852; 528/254; 528/68; 528/332; 524/800
(58) Field of Search ....................... 525/934, 55, 333.7, 525/191, 211; 524/800; 568/852; 528/45, 68, 254, 332

(56) References Cited

U.S. PATENT DOCUMENTS

| | | | |
|---|---|---|---|
| 4,118,427 A | 10/1978 | Rhein et al. | |
| 4,118,437 A | * 10/1978 | Parekh | |
| 4,246,376 A | 1/1981 | Didomenico, Jr. | 525/398 |
| 4,546,120 A | 10/1985 | Perrman et al. | 521/159 |
| 5,236,987 A | 8/1993 | Arendt | |
| 5,334,650 A | 8/1994 | Serdiuk et al. | 524/591 |
| 5,587,428 A | 12/1996 | Jones et al. | 525/165 |
| 5,665,433 A | 9/1997 | Moussa et al. | |
| 5,688,867 A | 11/1997 | Scheibelhoffer et al. | 525/168 |
| 5,783,272 A | 7/1998 | Wong | |
| 5,814,410 A | 9/1998 | Singer et al. | |
| 5,976,615 A | 11/1999 | Menovcik et al. | |
| 2002/0086966 A1 | 7/2002 | Weise et al. | |
| 2002/0107325 A1 | 8/2002 | Gilbert et al. | |

FOREIGN PATENT DOCUMENTS

| | | | |
|---|---|---|---|
| EP | 026 984 A1 | 4/1981 | |
| EP | WO 95/19997 | 7/1995 | C08F/20/00 |
| EP | WO 96/23034 | 8/1996 | C09D/167/00 |
| EP | WO 96/23035 | 8/1996 | C09D/167/02 |
| EP | WO 99/35189 | 7/1999 | |
| WO | WO02/50203 | 6/2002 | |

OTHER PUBLICATIONS

Frank N. Jones, "End–Grafting of Oligoesters Based on Terephthalic Acid and Linear Diols for High Solids Coatings", Apr. 21, 1995, pp. 1609–1618.
Robson F. Storey et al., "Proceedings of the twenty–fourth international waterborne, high–solids, and powder coating symposium", Feb. 5–7, 1997, pages title, & 1–21.
Frank N. Jones et al. "Recent studies of self–condensation and co–condensation of melamine–formaldehyde resins; cure at low temperatures", (1994), pp. 189–208.
Robson F. Storey et al., "Proceedings of the twenty–fourth international waterborne, high–solids, and powder coatings symposium", Feb. 21–23, 1990, pages title, & 447–470.
Shubang Gan et al, "Recent studies of the curing of polyerester–melamine enamels, possible causes of overbake softening", Feb. 1–3, 1989, pp. 87–109.
Walter H. Ohrbom et al., USSN 10/261,888, filied Sep. 30, 2002, pp. 1–42, and abstract.
Walter H. Ohrbom et al., USSN 10/261,428, filied Sep. 30, 2002, pp. 1–33, and abstract.

* cited by examiner

*Primary Examiner*—Kuo-Liang Peng
(74) *Attorney, Agent, or Firm*—Mary E. Golota

(57) ABSTRACT

The curable coating compositions of the invention comprise a particulate component having at least one binder component (a) which is a solid at 75° F./24° C., and an additive component (b). The curable coating compositions further comprise a crosslinking component (c) reactive with the at least one binder component (a). Additive component (b) has from 12 to 72 carbon atoms, is substantially free of any heteroatoms, is not a crystalline solid at 75° F./24° C. and comprises a mixture of two or more structures selected from the group consisting of aliphatic structures for additive component (b), aromatic-containing structures for additive component (b), cycloaliphatic-containing structures for additive component (b), and mixtures thereof, wherein at least one of the two or more structures is either a cycloaliphatic-containing structure or an aromatic-containing structure. The curable coating compositions are useful as powder coating compositions and powder slurry coating compositions having improved application and/or performance properties.

31 Claims, No Drawings

POWDER COATING COMPOSITIONS AND POWDER SLURRY COATING COMPOSITIONS CONTAINING MONOMERIC DIFUNCTIONAL COMPOUNDS

BACKGROUND OF THE INVENTION

This invention relates to powder coating compositions and powder slurry coating compositions intended for use in the automotive and/or transportation industries. This application is a Continuation-in-part of U.S. patent application Ser. No. 09/741,511, filed Dec. 19, 2000, now U.S. Pat. No. 6,541,594.

Powder coating and powder slurry compositions provide many of the performance properties of traditional solvent based coating compositions without the complications of liquid organic solvents. Powder coating compositions are applied as dry, finely divided particles. Powder slurry compositions typically include a first component that is in solid particulate form, i.e., a powder coating, and a second component that is liquid. The first component is dispersed in the second component to provide a slurry that can be applied using conventional spray application equipment and techniques.

In particular, the application and cure of powder coatings and powder slurry coatings results in significantly reduced emissions of volatile organic compounds (VOC's). Powder coatings and powder slurry coatings are also more amenable to recycling than traditional liquid coatings. As a result, powder coatings and powder slurry coatings have the potential for environmental and financial advantages.

However, powder coating compositions and powder slurry coating compositions can present manufacturing, performance and/or application challenges.

For example, the manufacture and application of powder coatings requires the use of resins that are solid at approximately room temperature. The prior art has made numerous attempts to translate the manufacturing, performance and/or application advantages of liquid resins to solid resins suitable for use in powder coatings.

While progress has been made, there still exists a need for a powder coating resin having an advantageous blend of properties with respect to manufacturing, application and/or performance attributes.

Automotive OEM coating applications require films having optimum smoothness, distinctness of image (DOI) and gloss. These performance requirements present challenges to the formulator of powder coatings and powder slurry coatings containing particulate components. The individual particles must flow and level out to the desired level of smoothness in a short time and temperature window, i.e., between the $T_g$ of the particulate resins and the crosslinking temperature. Individual particles that have not reached the desired level of smoothness and flow by the time that crosslinking temperatures are reached are permanently stopped from any further flow and leveling by the crosslinking and curing of the film.

Traditionally, higher films builds have sometimes been required to obtain finished films having a satisfactorily smooth appearance and necessary distinctness of image (DOI). However, the use of more coating composition as a corrective action is disadvantageous with respect to cost and initial introduction concerns.

In addition, powder coatings and powder slurry coating compositions are often vulnerable to gassing and popping defects. Such defects are believed to result from the upward passage of volatile gases from the curing film. Such gases may be the volatile products of crosslinking reactions. In the case of powder slurry coatings, the gases can also be the volatilization of the solvent used. In most cases this will be water together with other organic solvents. In the case of non-aqueous powder slurry coatings, it will be primarily organic solvents. Finally, these defects can be the result of trapped air escaping the coating while the film is curing. The frequency of pop defects may range from the intermittent to large tightly packed masses of hundreds of individual defects. In either case, the presence of these gassing or popping defects often renders the cured surface commercially unacceptable.

Traditional powder coating compositions, especially those used in clearcoat and topcoat applications, often utilize epoxy acid resin systems. Such systems often sacrifice scratch and mar resistance in order to obtain acceptable water resistance, chip resistance and etch resistance.

The processing of powder coating compositions and powder slurry compositions containing powder coatings typically requires the application of initial temperatures above the $T_g$ of the powder resin(s), followed by the application of temperatures sufficient to affect crosslinking if the coating is thermosetting. Thus, high cure schedules are often required. Application concerns and energy costs encourage the use of powder compositions having lower $T_g$ resins. The use of lower $T_g$ resins facilitates more rapid flow, improved appearance and lower cure temperatures.

However, storage and manufacturing problems can result when powder coating compositions having lower $T_g$ resins are utilized. Manufacturing is particularly challenging, especially with commonly used acid epoxy resin systems. Agglomeration of the solid particulate component during storage may be observed.

Inferior film adhesion and/or cracking of the applied powder coating film during curing may occur, for example, when the powder coating is applied over a previously applied coating. These negative performance characteristics can be magnified by higher film builds and poor storage stability of the powder coating composition.

Finally, finished films obtained from powder coating compositions can exhibit variable gloss and/or inferior performance characteristics, particularly when balancing scratch and mar resistance against water resistance, chip resistance and etch resistance. It is often difficult to achieve an acceptable balance of properties among these characteristics, especially with traditional acid epoxy powder/powder coating resin systems employed as clearcoats or pigmented topcoats.

Thus, it is desirable to provide improved powder coating compositions wherein the foregoing disadvantages are either eliminated or are minimized. Prior art attempts hereto have been unsuccessful.

In particular, it would be desirable to provide a curable coating composition containing a particulate component, i.e., either a powder coating composition or a powder slurry coating composition, that can obtain smooth, level cured films having optimum DOI without negatively affecting any other desirable application or finished film properties.

It would be also be desirable to provide a curable coating composition containing a particulate component, i.e., either a powder coating composition or a powder slurry coating composition, that is more resistant to gassing or popping defects without any loss of other desirable application or finished film properties.

SUMMARY OF THE INVENTION

These and other objects of the invention are met with the instant invention.

The curable coating compositions of the invention comprise a particulate component having at least one binder component (a) which is a solid at 75° F./24° C. and an additive component (b). The curable coating compositions also comprise a crosslinking component (c) that is reactive with binder component (a).

Additive component (b) has from 12 to 72 carbon atoms, is substantially free of any heteroatoms, is not a crystalline solid at 75° F./24° C. and comprises a mixture of two or more structures selected from the group consisting of aliphatic structures for additive component (b), aromatic-containing structures for additive component (b), cycloaliphatic-containing structures for additive component (b), and mixtures thereof, wherein at least one of the two or more structures is either a cycloaliphatic-containing structure or an aromatic-containing structure.

The crosslinking component (c) may be in the particulate component or may be in a liquid component into which the particulate component is dispersed.

DETAILED DESCRIPTION OF THE PREFERRED EMBODIMENTS

The curable coating compositions of the invention comprise a crosslinking component (c) and a particulate component comprising at least one binder component (a) and at least one additive component (b).

The particulate component of the invention will generally have individual particles in the shape of flat chips or discs having regular or irregular dimensions. Particles having an average particle size of from about 0.1 to 100 microns are suitable, with average particle sizes of from 1 to 75 microns more preferred and particles having an average particle size of from 15 to 45 microns being most preferred. Particle size as used herein refers to the average diameter of an object having irregular boundaries that can be determined with known test methods.

The at least one binder component (a) will generally be any oligomeric or polymeric material having at least two, preferably a plurality of active hydrogen containing functional groups. In the most preferred embodiment, the functional groups of binder component (a) are reactive with the functional groups of a crosslinking component (c). "Binder" as used herein refers to an organic material having at least two active hydrogen groups. "Active hydrogen group" as used herein refers to functional groups that donate a hydrogen group during the reaction with the functional groups of a crosslinking component (c). Examples of active hydrogen groups are carbamate groups, hydroxyl groups, amino groups, thiol groups, acid groups, hydrazine groups, activated methylene groups, and the like. Hydroxyl, acid and carbamate groups are most preferred for use as active hydrogen groups.

It is an aspect of the curable coating compositions of the invention that the binder component (a) normally be a solid at 75° F./24° C., the term "solid" referring to a substance of definite shape and relatively great density, low internal enthalpy, and great cohesion of its molecules. *Grant & Hackh's Chemical Dictionary, Fifth Edition* McGraw-Hill, Inc. pg. 541.

In general, binder components (a) suitable for use in the curable coating compositions of the invention will have a $T_g$ in the range of from 30° C. to 100° C., more particularly from 35° C. to 75° C., and most preferably from 40° C. to 65° C.

Illustrative examples of suitable binder components (a) include for example, acrylic polymers, modified acrylic polymers, polyesters, both saturated and unsaturated, polyepoxides, polycarbonates, polyurethanes, polyamides, polyimides, amine-modified resins, phenolic resins, urea resins, alkyd resins, polysiloxanes, and derivatives and mixtures thereof. Preferably, the polymer is an acrylic, polyurethane, modified acrylic or polyester. More preferably, the polymer is a polyester polymer.

Additionally, the binder components may include materials and oligomers. Illustrative examples of materials and oligomers are hyperbranched oligomers as described by Johansson, European Coatings Journal (2002), 31–33, Vicari EP 1070748, Zhu Chinese Journal of Polymer Science (2001), 155, and Coca U.S. Pat. No. 6,336,966 and urethane upgrades as described in Harris U.S. Pat. Nos. 6,391,969 and 6,150,465 as well as in Savino WO 0053653, WO 0036036 and WO 0036035 and Ohrbom WO 0036028.

In one embodiment of the invention, the polymer is an acrylic. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Acrylics made by radical atom transfer polymerization, as described by Barkac U.S. Pat. No. 6,339,126.

Modified acrylics can also be used as the binder component (a) according to the invention. Such acrylics may be polyester-modified acrylics or polyurethane-modified acrylics, as is well-known in the art. Polyester-modified acrylics with a Tg of over 24° C. modified with ε-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having active hydrogen groups such as hydroxyl groups can also be used as the polymer in the composition according to the invention. Such polyesters are well known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol). In a preferred embodiment, the binder component (a) will be a hydroxyl functional polyester.

Polyurethane oligomers and polymers having active hydrogen functional groups are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, hydroxy carbamate, amino acid and the like.

Binder component (a) will generally be present in the particulate component of the curable coating composition in an amount of from 40 to 100% by weight nonvolatile, preferably from 50 to 100% by weight nonvolatile, and most preferably from 60 to 100% by weight total nonvolatile film-forming components.

Additive component (b) is believed to provide certain benefits to the curable coating compositions of the invention containing a particulate component. While not wishing to be bound to a particular theory, it is believed that additive (b) may reduce the melt viscosity of the particulate component. This reduction in melt viscosity is believed to provide an applied coating having greater flow and leveling before crosslinking. As a result, it is believed that cured films made with the compositions of the invention will be smooth, level and glossy, even at lower applied film builds.

Additive component (b) should have from 12 to 72 carbons, have at least two functional groups (ii), be substantially free of heteroatoms, and not be a crystalline solid at room temperature.

The additive component (b) will generally have from 12 to 72 carbons, more preferably from 18 to 54 carbons, and most preferably from 36 to 54 carbons. In a particularly preferred embodiment of the invention, the additive component (b) will have 36 carbons.

"Heteroatoms" as used herein refers to atoms other than carbon or hydrogen. The phrase "substantially without" heteroatoms as used herein means that the portion of additive component (b) which does not include functional groups (ii) will generally have no more than two atoms which are other than carbon or hydrogen, i.e., atoms such as N, O, Si, mixtures thereof, and the like. More preferably, that portion of additive component (b) that does not include functional groups (ii) will have no more than one atom that is other than carbon or hydrogen. In a most preferred embodiment, that portion of additive component (b) that does not include functional groups (ii) will have no heteroatoms, i.e., will consist solely of carbon and hydrogen atoms. Thus, in a most preferred aspect of the invention, the only heteroatoms in additive component (b) will be present in functional groups (ii).

It is another aspect of the invention that additive component (b) will not be a crystalline solid at room temperature, i.e., at temperatures of from 65 to 75° F. "Crystalline" refers to a solid characterized by a regular, ordered arrangement of particles. Rather, additive component (b) will be an amorphous solid, a wax or a liquid at room temperature. "Amorphous" refers to a noncrystalline solid with no well-defined ordered structure.

In a more preferred embodiment of the invention, additive component (b) will comprise a mixture of two or more saturated or unsaturated structures selected from the group consisting of noncyclic structures for additive component (b), aromatic-containing structures for additive component (b), cyclic-containing structures for additive component (b), and mixtures thereof. Saturated structures and aromatic structures that are free of non-aromatic unsaturated sites are preferred, especially where durability issues are of concern. For example, a most preferred additive component (b) will comprise a mixture of two or more structures selected from the group consisting of aliphatic structures for additive component (b), aromatic-containing structures for additive component (b), cycloaliphatic-containing structures for additive component (b), and mixtures thereof.

It is particularly preferred that additive component (b) comprise at least two, more preferably three, of the three cited structures. If additive component (b) comprises only two of the three cited structures for additive component (b), then at least one of the two structures must be present as a mixture of two or more isomers thereof.

For example, the mixture of additive components (b) may comprise at least one aliphatic structure for additive component (b) and at least one other structure for additive component (b) selected from the group consisting of aromatic-containing structures for additive component (b), cycloaliphatic-containing structures for additive component (b), and mixtures thereof. If the 'at least one other structure for additive component (b)' is not a mixture of aromatic-containing structures for additive component (b) and cycloaliphatic-containing structures for additive component (b), either the aromatic-containing structures or the cycloaliphatic containing structures must be present as a mixture of two or more isomers.

Alternatively, the mixture that is additive component (b) may comprise at least one aromatic-containing structure for additive component (b) and at least one other structure for additive component (b) selected from the group consisting of aliphatic structures for additive component (b), cycloaliphatic-containing structures for additive component (b), and mixtures thereof. If the 'at least one other structure for additive component (b)' is not a mixture of aliphatic structures for additive component (b) and cycloaliphatic-containing structures for additive component (b), either the aliphatic structures or the cycloaliphatic containing structures must be present as a mixture of two or more isomers.

In one preferred embodiment, additive component (b) will comprise a mixture of two or more structures selected from the group consisting of aliphatic structures for additive component (b), aromatic-containing structures for additive component (b), cycloaliphatic-containing structures for additive component (b), and mixtures thereof, wherein at least one of the two or more structures is either a cycloaliphatic-containing structure or an aromatic-containing structure In a most preferred embodiment, additive component (b) will comprise one or more aliphatic structures for additive component (b), one or more aromatic-containing structures for additive component (b), and one or more cycloaliphatic-containing structures for additive component (b).

Particularly advantageous additive components (b) will comprise from 3 to 25% by weight of additive component (b) having an aliphatic structure, from 3 to 25% by weight of additive component (b) having an aromatic-containing structure, and 50 to 94% by weight of additive component (b) having a cycloaliphatic-containing structure.

More preferred mixtures of additive component (b) will comprise from 3 to 18% by weight of additive component (b) having an aliphatic structure, from 5 to 23% by weight of additive component (b) having an aromatic-containing structure, and 55 to 85% by weight of additive component (b) having a cycloaliphatic-containing structure.

Most preferred mixtures of additive component (b) will comprise from 5 to 10% by weight of additive component (b) having an aliphatic structure, from 10 to 20% by weight of additive component (b) having an aromatic-containing structure, and 60 to 70% by weight of additive component (b) having a cycloaliphatic-containing structure.

Finally, additive component (b) must comprise at least two functional groups (ii). Preferred additive components (b) may have from two to six functional groups (ii) while most preferably additive component (b) will have two to three functional groups (ii).

Functional groups (ii) may be selected from a variety of active hydrogen containing groups and groups reactive with such active hydrogen containing groups. While it is most preferred that additive components (b) enter into and be a part of the film-forming reaction, it is not a requirement of the invention that additive component (b) be crosslinkable with either binder component (a) or crosslinking component (c).

Thus, in one alternative embodiment of the invention, additive component (b) will not be a part of the film-forming reaction. In this embodiment of the method of the invention, the functional groups (ii) of additive component (b) will be chosen so as not to be reactable with either the functional groups of crosslinking component (c) or any functional groups of any binder components (a) present in the coating compositions of the invention. In this embodiment, film-forming reactions will most preferably occur between binder component (a) and crosslinking component (c).

In another embodiment of the invention, the functional groups (ii) of additive component (b) will be reactable with the functional groups of one or more binder components (a) present in the coating composition of the invention. In a more preferred version of this embodiment, at least one of binder components (a) or additive component (b) will also be reactable with crosslinking component (c).

In an alternative embodiment, the functional groups (ii) of additive component (b) will be reactable with one or more functional groups of one or more crosslinking components (c).

In another embodiment, functional groups (ii) of additive component (b) will be reactable with both of the functional groups of binder component (a) and crosslinking component (c). It will be appreciated that in this instance, there may be more than one type of functional group (ii) on additive component (b). That is, additive component (b) may comprise two or more different functional groups (ii).

It is most preferred that functional group (ii) be reactable with at least one functional group of crosslinking component (c) and not with any binder components (a).

The above noted film-forming reactions may produce chemical linkages that may or may not be thermally reversible. However, in a most preferred embodiment of the invention, the functional groups (ii) of additive component (b) and the functional groups of crosslinking component (c) will be selected so that reaction there between results in a thermally irreversible chemical linkage. The term "thermally irreversible linkage" as used herein refers to a linkage the reversal of which is not thermally favored under the traditional cure schedules used for automotive coating compositions. Illustrative examples of suitable thermally irreversible chemical linkages are urethanes, ureas, esters and non-aminoplast ethers. Preferred thermally irreversible chemical linkages are urethanes, ureas and esters, with urethane linkages being most preferred. Such chemical linkages will not break and reform during the crosslinking process as is the case with the linkages formed via reaction between hydroxyl groups and aminoplast resins.

Certain "pairs" of functional groups will produce such thermally irreversible chemical linkages. If one member of a "pair" is selected for use as functional group (ii), the other member of the "pair" will be selected as the functional group of the compound or material intended to react with additive component (b), i.e., either one or both of binder component (a) and crosslinking component (c), most preferably as functional group of crosslinking agent (c).

Examples of illustrative reactant or functional group "pairs" producing thermally irreversible linkages are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like.

Illustrative functional groups (ii) will preferably be selected from the group consisting of carboxyl, hydroxyl, aminoplast functional groups, urea, carbamate, isocyanate, (blocked or unblocked), epoxy, cyclic carbonate, amine, aldehyde and mixtures thereof. Preferred functional groups (ii) are hydroxyl, primary carbamate, isocyanate, aminoplast functional groups, epoxy, carboxyl and mixtures thereof. Most preferred functional groups (ii) are hydroxyl, primary carbamate, and mixtures thereof. These preferences pertain regardless of whether a thermally reversible or irreversible linkage is desired. It will be appreciated by those of skill in the art that it is the selection of a corresponding reactable functional groups in either binder components (a) or crosslinking components (c) that determine whether resulting linkages will be thermally reversible or irreversible.

Aminoplast functional groups may be defined as those functional groups resulting from the reaction of an activated amine group and an aldehyde or a formaldehyde. Illustrative activated amine groups are melamine, glycoluril, benzoguanamine, amides, carbamates, and the like. The resulting reaction product may be used directly as functional group (ii) or may be etherified with an alcohol prior to use as functional group (ii). The aminoplast may be further modified to change some of its basic properties, for example, by the reaction with amides, to raise the Tg of the resulting material for use in powder coatings, as discussed by Balwant in U.S. Pat. No. 5,665,852. Liquid aminoplast resins may also be used as discussed by Harris in U.S. Pat. Nos. 6,391,969 and 6,150,465.

Amine groups suitable for use as functional group (ii) may be primary or secondary, but primary amines are most preferred.

Illustrative examples of suitable additive components (b) having functional groups (ii) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of C12–18 monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commercially available from Uniquema of Wilmington, Del.

Hydroxyl functional additive components (b) are commercially available as the Pripol™ saturated fatty acid dimer (Pripol™ 2033) supplied by Uniqema of Wilmington, Del. Hydroxyl functional additive components (b) may also be obtained by reduction of the acid group of the above-discussed fatty acids.

Additive components (b) having two or more carbamate functional groups may be obtained via the reaction of the hydroxyl functional additive components (b) with a low molecular weight carbamate functional monomer such as methyl carbamate under appropriate reaction conditions. Alternatively, carbamate functional additive components (b) may be made via the decomposition of urea in the presence of hydroxyl functional additive component (b) as described above. Finally, carbamate functional additive components (b) can be obtained via the reaction of phosgene with the hydroxyl functional additive component (b) followed by reaction with ammonia.

Additive components (b) having amine functional groups (ii) may be obtained via reaction of the acid functional component (a) to form an amide, followed by conversion to a nitrile and subsequent reduction to an amine.

Additive components (b) having isocyanate functional groups (ii) made be obtained via reaction of the amine functional component (a) described above with carbon dioxide.

Additive components (b) having aminoplast functional groups (ii) may be made via reaction of carbamate or amide functional additive component (b) as described above with formaldehyde or aldehyde. The resulting reaction product may optionally be etherified with low boiling point alcohols.

Additive components (b) having aldehyde functional groups (ii) may be made via reduction of the acid functional additive components (b) described above.

Additive components (b) having urea functional groups (ii) may be made via reaction of an amine functional component (a) with urea. Alternatively, amine functional component (a) can be reacted with phosgene followed by reaction with ammonia to produce the desired urea functional groups (ii).

Additive components (b) having epoxy functional groups (ii) may be made using either saturated or unsaturated fatty acids described above. If an unsaturated fatty acid is used, reaction with peroxide will form internal epoxy groups. More preferably, an acid or hydroxyl functional additive component (b) will be reacted with epichlorohydrin. Preferred epoxy functional additive components (b) will be obtained using saturated starting materials.

Additive components (b) having cyclic carbonate functional groups (ii) may be made via carbon dioxide insertion into an epoxy functional additive component (b) as described above.

A most preferred example for additive component (b) will be a mixture of the following structures:

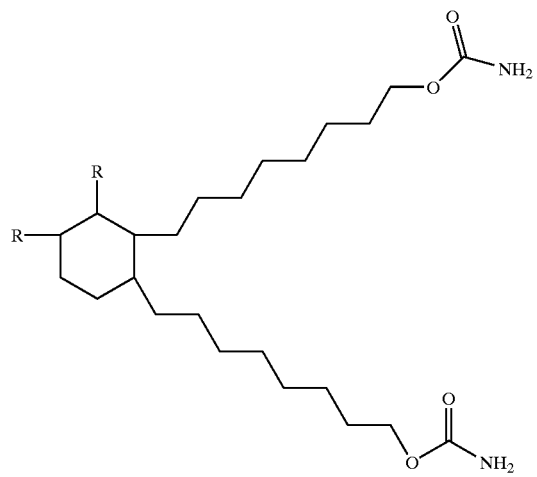

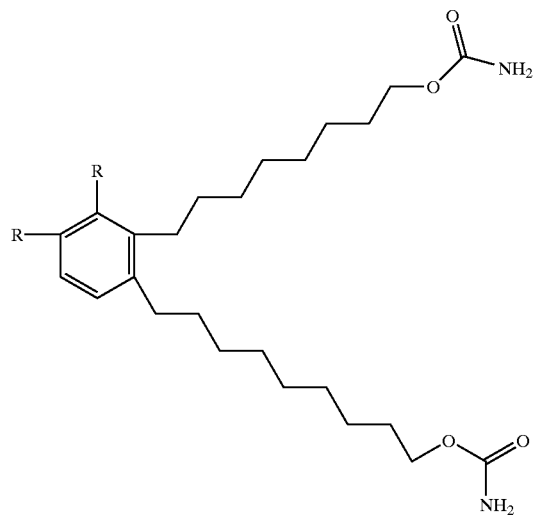

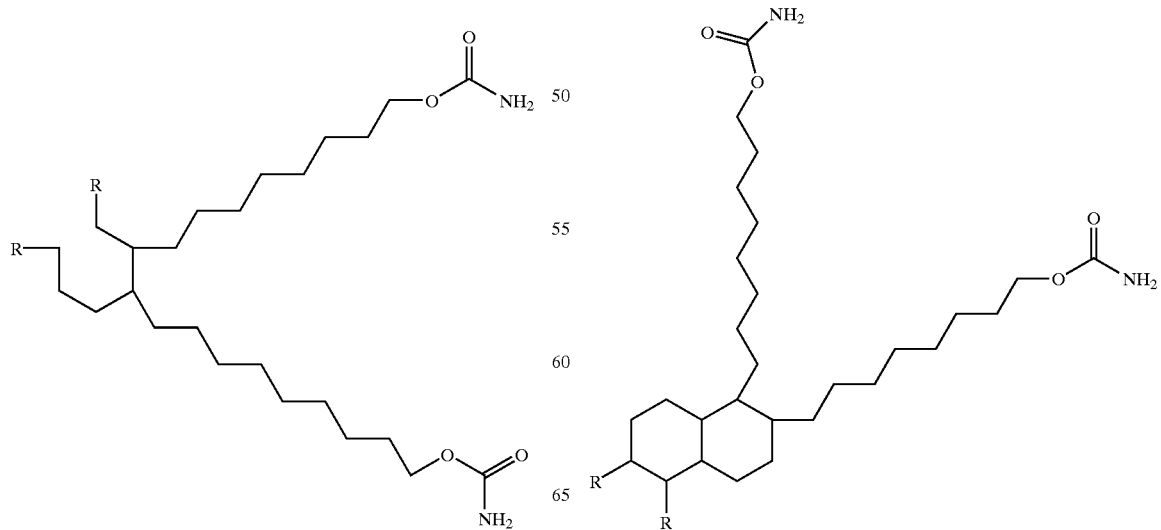

-continued

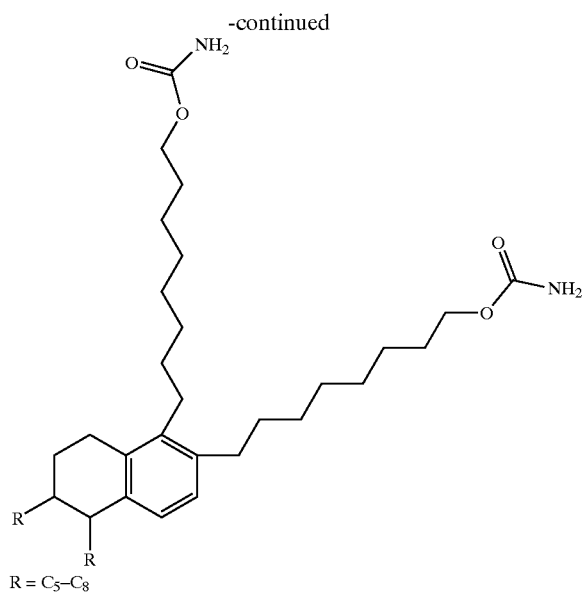

R = C5–C8

Additive component (b) will generally be present in the particulate component of the curable coating compositions of the invention in amounts of from 1 to 30% by weight, more preferably from 2 to 20 and most preferably from 5 to 15% by weight, all based on the total nonvolatile film-forming components in the curable coating composition.

The curable coating compositions of the invention will further comprise a crosslinking component (c). Crosslinking component (c) will be used in amounts of from 1 to 90%, preferably from 3 to 75%, and more preferably from 5 to 50% by weight, all based on the total nonvolatile film-forming components of the curable coating composition.

As discussed above, crosslinking component (c) will comprise functional groups that are reactive with one or both of additive component (b) and one or more binder components (a), and most preferably with both components (a) and (b).

In a preferred embodiment, the reaction between crosslinking component (c) and additive component (b) will produce a thermally irreversible bond as discussed above. It will be appreciated that in this case, the selection of functional groups will be dependent upon the selection of the functional groups of either additive component (b) or one or more binder components (a). That is, the functional groups of crosslinking component (c) and the component reacting therewith must form one of the functional group "pairs" discussed above which result in thermally irreversible linkages.

For example, when the functional groups of either component (a) or (b) are hydroxyl, functional groups of crosslinking component (c) may be selected from the group consisting of isocyanate (blocked or unblocked), epoxy, and mixtures thereof, and most preferably will be isocyanate groups, whether blocked or unblocked.

Illustrative examples of epoxy functional crosslinking components (c) are all known epoxy functional polymers and oligomers. Preferred epoxy functional crosslinking agents are glycidyl methacrylate polymers and isocyanurate containing epoxy functional polymers such as trisglycidyl isocyanurate and the reaction product of glycidol with an isocyanate functional isocyanurate such as the trimer of isophorone diisocyanate (IPDI).

Illustrative examples of isocyanate functional crosslinking agents (c) are all known isocyanate functional polymers and oligomers. Preferred isocyanate functional crosslinking agents are isocyanato ethylacrylate polymers and the trimers of diisocyanates such as IPDI and hexamethylene diisocyanate (HDI), which may be blocked or unblocked.

When the functional groups of either additive component (b) or a binder component (a) are carboxyl, functional groups will most preferably be epoxy as described above.

When the functional groups of either additive component (b) or a binder component (a) are carbamate, the functional groups of crosslinking component (c) may be selected from the group consisting of aminoplast resins, aldehydes, and mixtures thereof. Most preferably, when the functional groups of additive component (b) and/or a binder component (a) are carbamate, functional groups of crosslinking component (c) will be aminoplast functional groups if a thermally irreversible linkage is desired. Alternatively, if thermally reversible linkages are sufficient, the functional groups of crosslinking component (c) may be isocyanate when the functional groups of components (a) and/or (b) are carbamate. In this case, the resulting link is an allophanate that can be made to be reversible during the cure schedule when Lewis acid catalysts such as dibutyl tin diacetate are used.

Illustrative examples of suitable aminoplast resins are melamine formaldehyde resins (including monomeric or polymeric melamine resin and partially or fully alkylated melamine resin ), urea resins (e.g., methylol ureas such as urea formaldehyde resin, alkoxy ureas such as butylated urea formaldehyde resin), and carbamate formaldehyde resins.

When the functional groups of additive component (b) and/or a binder component (a) are epoxy, functional groups may be carboxyl or hydroxyl, or mixtures thereof, carboxyl being most preferred.

Illustrative examples of carboxyl functional crosslinking components (c) are acid functional acrylics, acid functional polyesters, acid functional polyurethanes, and the reaction products of polyols such as trimethylol propane with cyclic anhydrides such as hexahydrophthalic anhydride. Such materials are known in the art.

When the functional groups of additive component (b) and/or a binder component (a) are cyclic carbonate, functional groups should be amine if a thermally irreversible linkage is desired. An illustrative example of an amine functional crosslinking component (c) is triaminononane. Anther example is the reaction product of a hydroxy ketamine resin which may be formed, for example, by the reaction of a hydroxy ketamine with an isocyanate functional material, oligomers or polymer.

Similarly, when the functional groups of additive component (b) and/or a binder component (a) are amine, functional groups should be cyclic carbonate, isocyanate functional as described above, or mixtures thereof in order to obtain thermally irreversible linkages.

Cyclic carbonate functional crosslinking components (c) may be obtained by the reaction product of carbon dioxide with any of the above described epoxy functional crosslinking components (c). Alternatively, a cyclic carbonate functional monomer may be obtained by the reaction of carbon dioxide with an epoxy functional monomer such as glycidyl methacrylate or glycidol, followed by polymerization/oligomerization of the cyclic carbonate functional monomer. Additional methods of obtaining cyclic carbonate functional crosslinking agents are known in the art and may be used.

When the functional groups of additive component (b) and/or a binder component (a) are isocyanate, functional groups may be hydroxy, amine or mixtures thereof in order to obtain thermally irreversible linkages, hydroxy being most preferred.

Hydroxy functional crosslinking components (c) are polyols, hydroxy functional acrylics, hydroxy functional polyesters, hydroxy functional polyurethanes, hydroxy functional isocyanurates and mixtures thereof as are known in the art.

The above noted crosslinking components (c) are also suitable for use in those embodiments where crosslinking component (c) is used to provide a thermally reversible bond. It will be appreciated that in this case, the respective functional groups will be selected so as not to form any of the above noted "pairs" which produce thermally irreversible groups.

Examples of functional groups that are reactive with each other and result in thermally reversible bonds are well known in the art. Illustrative examples are the reaction of aminoplasts with polyols, the reaction of cyclic anhydrides with polyols, and the reaction of activated secondary carbamates such as TACT with hydroxy groups. Suitable examples of the individual components are discussed above and may be selected accordingly.

When the crosslinker (c) is to be incorporated into the particulate component, crosslinking component (c) must be a solid at room temperature. Alternatively, liquid crosslinking components (c) may be used in the liquid component of powder slurry compositions.

It will be appreciated by those of skill in the art that when the particulate component contains a binder component (a), an additive component (b) and a crosslinking component (c), the curable coating composition of the invention may be used as a powder coating. Alternatively, such a particulate component may be dispersed in a liquid component to provide a powder slurry coating composition.

Particulate components useful in curable coating compositions of the invention may be prepared by a variety of ways. In general, materials are first premixed and then processed so as to provide a homogenous mixture that can be pulverized or broken into individual particles. Following pulverizing, the individual particles are classified.

The average size and shape of the individual particles of the particulate component are dependent upon handling, processing, and equipment considerations. Particles having an average particle size of from about 0.1 to 100 microns are suitable, with average particle sizes of from 1 to 75 microns more preferred and particles having an average particle size of from 15 to 45 microns being most preferred. The individual particles of the particulate component may be in the shape of spheres, flat chips or discs having regular or irregular dimensions. Particle size as used herein refers to the average diameter of an object having irregular boundaries that can be determined with known test methods.

In a preferred embodiment, the particulate component used in the curable coating compositions of the invention may be made by initially mixing at least two or more of components (a), (b) and (c) together, wherein at least one of the mixed components is additive component (b).

It is most preferred that additive component (b) be melted to a liquid state before it is mixed with the one or more other components. Heating of additive component (b) to temperatures of at least 30° C., more preferably to 40° C.

For example, all of the components (a), (b), and (c) may be mixed together with any other desired components of the curable coating compositions, i.e., pigments, additives, etc.

The resulting mixture is then processed according to accepted powder compound manufacturing technology, for example via sheet, roll or drop techniques. After solidifying, the mixture is broken into particles having a desired size and shape as discussed above.

Alternatively, and most preferably, the additive component (b) and the at least one binder component (a) will be mixed together and then processed according to accepted powder compound manufacturing technology, for example via sheet, roll or drop techniques. After solidifying, the mixture is broken into particles having a desired size and shape as discussed above.

In a most preferred embodiment, the processed particulate mixture containing binder (a) and additive component (b) will then be mixed with the remaining components of the desired curable coating composition, i.e., crosslinking component(s), other additives, pigments, etc, and subsequently processed per accepted powder manufacturing techniques.

Powder slurry compositions may be made by dispersing the solid particulate component in a liquid component. The liquid component may be water, water-soluble solvents, liquid crosslinking components and mixtures thereof. Illustrative liquid crosslinking components include liquid aminoplast resins. Thickeners and other known additives may also be added to the liquid component.

During the preparation of suitable powder slurry compositions, the components may be combined and mixed well by conventional processes. A grinding or milling operation may follow such admixture. A preferred method of manufacture is disclosed in U.S. Pat. No. 5,379,947, hereby incorporated by reference. Powder slurry compositions can be applied by spray or by electrostatic deposition.

EXAMPLE

Preparation of an Additive Component (b)

A mixture of 59.4 parts of Pripol™ saturated fatty acid dimer diol, (commercially available from Uniqena), 20.1 parts methyl carbamate, 20.4 parts toluene and 0.09 parts of dibutyl tin oxide are heated to reflux. Once at reflux, the methanol is removed from the reaction mixture and the toluene is allowed to return to the reaction mixture. After 96% of the hydroxy groups are converted to primary carbamate groups, the excess methyl carbamate and toluene are removed by vacuum distillation. A dicarbamate functional additive component (b) was obtained.

Preparation of a Particulate Powder Coating Composition According to the Invention A powder coating composition according to the invention was prepared according to the following method.

| Raw Material Component | Amount (pph) |
| --- | --- |
| Triazole-blocked IPDI | 10.4 |
| Hydroxyl functional polyester | 81.0 |
| Benzoin | 0.5 |
| Additive component (b) | 5.0 |
| 68% modified acrylic on silica | 1.5 |
| HALS | 1.1 |
| Bismuth subsalicylate catalyst | 0.4 |

The hydroxyl functional polyester and the dicarbamate functional additive component (b) set forth in Table 1 above were initially melt mixed at a temperature of 93° C. and poured onto a flat surface and cooled to room temperature. Following cooling, the solid mixture was broken into particles of from about 0.24 to 0.50 inches. This mixture was then combined with the remaining components set forth above in Table 1 and dry blended for approximately two minutes at low speed on a laboratory mixer. The resulting mixture was then placed in a ZSK-30 Twin Screw extruder. The temperature for Zone 1 of the extruder was 90° C. and 110° C. for Zone 2 of the extruder. The speed of the extruder was 250 rpm.

After extrusion, the resulting extrudate was cooled on a chill roller and milled on a Retsch mill at low speed. The resulting particulate component was classified through a 75 micron sieve.

96 grams of the resulting particulate component was mixed with 4 grams of a standard silica treated aluminum powder (PCR8154 from Eckhart) to provide an aluminum powder basecoat. The coating was then applied to steel test panels using a gravity corona spray gun. The coated panels were cured for 20 minutes at 160° C. to provide a cured film of from 1.8 to 2.4 mils. A smooth level cured film was obtained.

It is claimed:

1. A curable coating composition, comprising a particulate component comprising at least one binder component (a) which is a solid at 75° F./24° C. and an additive component (b), wherein additive component (b) has from 12 to 72 carbon atoms, is substantially free of any heteroatoms, is not a crystalline solid at 75° F./24° C. and comprises a mixture of two or more structures selected from the group consisting of aliphatic structures for additive component (b), aromatic-containing structures for additive component (b), cycloaliphatic-containing structures for additive component (b), and mixtures thereof, wherein at least one of the two or more structures is either a cycloaliphatic-containing structure or an aromatic-containing structure, and a crosslinking component (c) reactive with the at least one binder component (a).

2. The curable coating composition of claim 1 wherein the additive component (b) is present in the particulate component in an amount of from 1 to 30% by weight, based on the total vehicle solids of the particulate component.

3. The curable coating composition of claim 2 wherein the additive component (b) is present in the particulate component in an amount of from 2 to 20% by weight, based on the total vehicle solids of the particulate component.

4. The curable coating composition of claim 3 wherein the additive component (b) is present in the particulate component in an amount of from 5 to 15% by weight, based on the total vehicle solids of the particulate component.

5. The curable coating composition of claim 1 wherein the additive component (b) comprises at least one aliphatic-containing structure and at least one other structure selected from the group consisting of aromatic-containing structures, cycloaliphatic-containing structures, and mixtures thereof.

6. The curable coating composition of claim 5 wherein the at least one other structure is present as a mixture of aromatic containing structures and cycloaliphatic containing structures.

7. The curable coating composition of claim 5 wherein the at least one other structure is not a mixture of aromatic containing structures and cycloaliphatic containing structures.

8. The curable coating composition of claim 7 wherein the at least one other structure is present as a mixture of the isomers of either aromatic containing structures or cycloaliphatic containing structures.

9. The curable coating composition of claim 1 wherein additive component (b) comprises at least one aromatic-containing structure and at least one other structure selected from the group consisting of aliphatic-containing structures, cycloaliphatic-containing structures, and mixtures thereof.

10. The curable coating composition of claim 9 wherein additive component (b) comprises a mixture of aromatic containing structures and cycloaliphatic containing structures.

11. The curable coating composition of claim 9 wherein the at least one other structure is not a mixture of aliphatic containing structures and cycloaliphatic containing structures.

12. The curable coating composition of claim 11 wherein the at least one other structure is present as a mixture of the isomers of either aliphatic containing structures or cycloaliphatic containing structures.

13. The curable coating composition of claim 1 wherein additive component (b) comprises at least one aliphatic-containing structure, at least one aromatic-containing structure, and at least one cycloaliphatic-containing structure.

14. The curable coating composition of claim 1 wherein additive component (b) comprises from 3 to 25% by weight aliphatic-containing structures, 3 to 25% by weight aromatic-containing structures, and 50 to 94% by weight cycloaliphatic-containing structures, all based on the total weight of additive component (b).

15. The curable coating composition of claim 14, wherein additive component (b) comprises from 3 to 18% by weight aliphatic structures, 5 to 23% by weight aromatic containing structures, and 55 to 85% by weight cycloaliphatic containing structures, all based on the total weight of additive component (b).

16. The curable coating composition of claim 15 wherein additive component (b) comprises from 5 to 10% by weight aliphatic structures, 10 to 20% by weight aromatic containing structures, and 60 to 70% by weight cycloaliphatic containing structures, all based on the total weight of additive component (b).

17. The curable coating composition of claim 1 wherein additive component (b) comprises from 18 to 54 carbons.

18. The curable coating composition of claim 17 wherein additive component (b) comprises 36 to 54 carbons.

19. The curable coating composition of claim 18 wherein additive component (b) comprises 36 carbons.

20. The curable coating composition of claim 1 wherein additive component (b) has from 2 to 6 functional groups (ii).

21. The curable coating composition of claim 20 wherein additive component (b) has 2 functional groups (ii).

22. The curable coating composition of claim 21 wherein additive component (b) has at least two functional groups reactive with the functional groups of the at least one binder component (a).

23. The curable coating composition of claim 1 wherein additive component (b) comprises at least two functional groups reactive with one or more functional groups of crosslinking component (c).

24. The curable coating composition of claim 23 wherein the crosslinking component is a solid at 75° F./24° C. and is in the particulate component.

25. The curable coating composition of claim 1 wherein the particulate component is dispersed in a liquid component.

26. The curable coating composition of claim 25 wherein the liquid component comprises water.

27. The curable coating composition of claim 25 wherein crosslinking component (c) is a liquid and in the liquid component.

28. The curable coating composition of claim 27 wherein the liquid component further comprises water.

29. The curable coating composition of claim 1 wherein the particulate component has an average particle size of from 0.1 to 100 microns.

30. The curable coating composition of claim 29 wherein the particulate component has an average particle size of from 1 to 75 microns.

31. The curable coating composition of claim 30 wherein the particulate component has an average particle size of from 15 to 45 microns.

* * * * *